(12) United States Patent
Kim

(10) Patent No.: US 6,776,942 B2
(45) Date of Patent: Aug. 17, 2004

(54) MOLD FOR MAKING GOLF BALLS AND METHODS FOR USING IT

(75) Inventor: Hyun Jin Kim, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 289 days.

(21) Appl. No.: 09/990,189

(22) Filed: Nov. 20, 2001

(65) Prior Publication Data

US 2003/0096661 A1 May 22, 2003

(51) Int. Cl.$^7$ .................. B29C 45/14; B29C 45/34; B29C 45/43; B29C 70/70
(52) U.S. Cl. .................. 264/102; 264/279.1; 264/335; 425/116; 425/437; 425/812
(58) Field of Search .................. 264/102, 279.1, 264/335; 425/116, 812, 437

(56) References Cited

U.S. PATENT DOCUMENTS

| | | | | |
|---|---|---|---|---|
| 5,061,427 A | * | 10/1991 | Hirzel ..................... | 264/219 |
| 5,827,567 A | * | 10/1998 | Molitor .................... | 427/135 |
| 5,849,237 A | * | 12/1998 | Inoue ...................... | 264/335 |
| 6,033,724 A | * | 3/2000 | Molitor .................... | 427/135 |
| 6,336,871 B1 | * | 1/2002 | Ihara et al. ............... | 473/367 |
| 6,422,850 B1 | * | 7/2002 | Shannon et al. ........... | 425/116 |
| 2003/0203763 A1 | | 10/2003 | Best ........................ | 473/290 |
| 2003/0203764 A1 | | 10/2003 | Dabbs et al. .............. | 473/291 |

FOREIGN PATENT DOCUMENTS

JP 08300363 A * 11/1996 ........... B29C/33/38

OTHER PUBLICATIONS

Gunter Mennig, Mold–Making Handbook, 1998, Hanser/Gardner Publications, Inc., 2nd edition, pp. 220–222.*
"Pre–Texturizing Mold Finishes Required", *About Texturizing*, Mold–Tech, Apr., 2001, 2 pgs.
"Porcerax II", International Mold Steel, Inc., pp. 1–10, no date.

* cited by examiner

Primary Examiner—Robert B. Davis
(74) Attorney, Agent, or Firm—Sheppard, Mullin, Richter & Hampton LLP

(57) ABSTRACT

Molds made from a porous metal material allow for superior injection and compression molding of golf ball portions, such as cores, intermediate layers and covers. Use of the porous material in the sections contacting molding material, such as mold sections forming cavities, pins, or runners, allows for production of superior ball portions, with reduced formation of pin marks, knit lines, and other imperfections leading to degradation of the properties of the resulting portions. All or part of the mold can be made from the porous metal. Particular mold apparatus incorporate vacuum and/or compression devices to improve venting and release of the ball portions from the mold. Also, methods for preparing a layer for a golf ball incorporates using a mold made from a porous material and incorporating use of vacuum or pressurizing devices.

23 Claims, No Drawings

MOLD FOR MAKING GOLF BALLS AND METHODS FOR USING IT

BACKGROUND OF THE INVENTION

This invention relates generally to molds used for the production of golf balls using injection or compression molding processes, and it also relates to methods incorporating the use of these molds. The molds and related methods allow for greater ease in ball manufacture and allow for golf balls having superior properties.

Golf balls generally include a spherical core and one or more layers placed over the core. These cores can be made from a single material or can themselves include multiple layers of core material. These cores can be made using either compression or injection molding processes. Layers are placed over the core using a number of methods, including compression molding and injection molding.

Injection molding generally involves using a mold having one or more sets of two hemispherical mold sections that mate to form a spherical cavity during the molding process. The pairs of mold sections are configured to define a spherical cavity in their interior when mated. When used to mold an outer cover layer for a golf ball, the mold sections can be configured so that the inner surfaces that mate to form the spherical cavity include protrusions configured to form dimples on the outer surface of the molded cover layer. The mold sections are connected to openings, or gates, evenly distributed near or around the parting line (i.e. point of intersection) of the mold sections through which the material to be molded flows into the cavity. The gates are connected to a runner and a sprue that serve to channel the molding material through the gates. The mold generally also includes vent pins located adjacent to the upper and lower poles of the spherical cavity formed by the mold sections. These vent pins are configured to retract from the mold sections to allow for air and other gases that build during the injection process to flow out of the cavity through the voids left by the retracted pins. The mold also includes ejection pins configures to extend from the mold sections into the cavity to push against the molded part and remove it from the mold. When used to mold a layer onto an existing structure, such as a ball core, the mold also includes a number of support pins (also known as core pins), disposed throughout the mold sections. The support pins are configured to be retractable, moving into and out of the cavity perpendicular to the spherical surface cavity surface. The support pins maintain the position of the core while the molten material flows through the gates into the cavity between the core and the mold sections.

One example of use of injection molding in preparing golf balls is in molding of a layer over a ball core. First, the core is placed inside a set of mold sections, and the mold sections are closed to form a spherical cavity around the core. The core is supported centrally in the cavity by the support pins, which are in an extended position to tightly engage the core. The mold sections and core are sized and placed to center the core in the shell cavity between the core and the inner surface of the mold sections. Then, a molten polymeric material is injected into the mold cavity under pressure through the gates. This polymeric material can be thermoplastic, or chemically reactive; that is, the material can begin to react during or after molding and form crosslinks to harden. When the space is mostly, but not completely, filled with the material, the support pins are retracted. At this point, the material in the cavity is sufficient in amount and viscosity to hold the core in place without the support pins. Injection of molten material continues, so that the material flowing through the gates fills the voids left by the retracted support pins. Eventually, the flow-fronts formed by the flows through each gate meet to form a complete layer over the core. The vent pins are retracted to provide venting paths to allow air and other gases in the cavity to flow out of the mold. The molded material layer is allowed to cool and hardened, and the layer and core are then removed from the mold by extending the ejection pins to push the core and molded layer out of the mold.

Another known method of forming a layer over a ball core involves use of both compression and injection molding. First, injection molding is used to form hemispherical half-shells. These are formed by using injection apparatus in which the mold sections are configured to form cavities that are hemispherical, rather than spherical. After the half-shells are formed, they are placed over a ball core in a compression molding apparatus. In the compression molding apparatus, the half-shells are subjected to heat and are pressed together along their equatorial edges to fuse and form a spherical layer over the core.

Molds currently used in molding processes for golf balls are made from aluminum or other conventional metal materials, such as 4140, P-20, or HR 13 steels. These materials are readily worked to produce the necessary structures. Though molds made from these materials are adequate for producing balls of commercial quality, they introduce certain imperfections and production difficulties. For example, during the injection process, weld or knit lines are formed when the flows of molten molding material do not fuse completely. These lines can occur due to various factors, such as non-uniform mold wall thicknesses, unusual flow paths of the molten material, pins blocking flow of material, or positioning of gates. Also, lines can form at the points of contact of the flow-fronts through the gates. Additionally, when material fills the space left by the retracting support pins, the material already has cooled to some degree, and the flow fronts of the material meet in this space to form knit lines. These lines are areas of weakness in the layer that are prone to fracture or crack. Knit line formation, and the subsequent weakness, is worsened when venting from the mold is insufficient to allow for the trapped gases to quickly exit. In addition to causing the marks discussed above, the compressed gases can produce burn marks caused by trapped gas during molding. Another problem is that of short shots, in which a part of the mold is not completely filled before the resin solidifies. This can occur when trapped gases are in a dead-end position, and gas venting is insufficient, producing increased pressure in the cavity that keeps out resin. In compression molding, trapped gas caused by improper venting can result in uneven distribution of the plastic melt between the core or mantled core insert and the cavity wall. This can lead to a sink on the molded surface of the ball or the molded layer having uneven thickness.

In view of the above, it is apparent that superior molds for manufacture of golf balls are needed that allow for superior molding quality, improved process control, and improved ball durability under impact. The present invention fulfills this need and other needs, and provides further related advantages.

SUMMARY OF THE INVENTION

The present invention is embodied in a mold configured for use in preparing a portion of a golf ball from a ball material. The mold has a contact region configured to contact the ball material during preparation of the portion, and the contact region comprises porous metal. The porous metal preferably has porosity sufficient to allow gases to escape through the porous metal. The porous metal preferably has a porosity between about 5% and about 50% by volume, more preferably between about 5% and about 40%, most preferably between about 10% and about 30%. The porous metal preferably incorporates interconnected pores in its structure having diameters between about 3 and about 10 microns. The porous metal preferably may comprise aluminum or a metal alloy, such as stainless steel.

Molds within the scope of the present invention preferably are configured to form a core, an intermediate layer, or a cover layer of a golf ball. In a preferred embodiment, the contact region of the mold is a plurality of mold sections that removably mate to define a generally spherical cavity, the mold sections incorporating porous metal. In preferred embodiments, the mold includes retractable support pins attached to the mold sections projecting into the cavity to support an inner portion over which the outer ball portion is prepared, with the support pins incorporating porous metal. The mold also may include extendable ejector pins attached to the mold sections configured to extend into the cavity to eject molded ball portions from the mold, with the ejector pins incorporating porous metal. The mold also may include retractable vent pins attached to the mold sections configured to retract from the cavity to allow gases to exit the mold cavity, with the vent pins incorporating porous metal. Additionally, the contact region of the mold may include a sprue, runner, or gates configured to route ball material to flow into the cavity, with the sprue, runner, or gates incorporating porous metal. Molds within the scope of the present invention may be configured for use in an injection or compression molding process.

A particularly preferred embodiment of the present invention is a mold in which the contact region of the mold defines an interior space, in which the ball material is situated, and an exterior space, and the mold further includes a vacuum device configured to reduce the pressure in the exterior space to a value less than the pressure in the interior space. Another preferred embodiment includes a pressurizing device configured to increase the pressure in the exterior space to a value greater than the pressure in the interior space. Yet another preferred embodiment includes both a vacuum and pressurizing device.

The present invention also resides in a method for forming a portion of a golf ball, including: preparing a mold incorporating porous metal and configured for use in preparing a portion of a golf ball, in which the mold defines an exterior space having an exterior pressure and an interior space having an interior pressure, and the mold further includes a vacuum device configured to reduce the exterior pressure to a value less than the interior pressure; using the vacuum device to reduce the exterior pressure below the interior pressure sufficient to increase flow of gas through the porous metal from the interior space to the exterior space; and, placing a ball material into the mold to form the portion so that gas flows from the interior space to the exterior space.

The present invention also resides in a method for forming a portion of a golf ball, including: preparing a mold incorporating porous metal and configured for use in preparing a portion of a golf ball from a ball material, in which the mold defines an exterior space having an exterior pressure and an interior space having an interior pressure, and the mold further includes a pressurizing device configured to increase the exterior pressure to a value greater than the interior pressure; placing a ball material into the mold to form the portion; and, using the pressurizing device to increase the exterior pressure above the interior pressure to a value sufficient to improve release of the portion from the mold.

Other features and advantages of the present invention should become apparent from the following detailed description of the preferred embodiments.

DESCRIPTION OF THE PREFERRED EMBODIMENTS

The present invention is embodied in molds for use in molding of golf ball portions, such as cores, intermediate layer, and cover layers, made at least in part from a porous metal material. The porous metal is suitable for use as part of an injection or compression mold. Use of porous metal allows for preparation molds that provide better process control than molds currently used. This results in higher quality molded ball portions having improved impact durability and cosmetic quality. The porous metal can be used for all or part of the mold sections defining the spherical cavity. Other regions of the mold that can advantageously be made from porous metal include pins, runners, sprues, and any other parts of the mold which come into contact with the material from which the ball portions are formed.

Use of porous metal material in molds allows for markedly improved gas venting than use of conventional materials. Porous metal also allows for improved release of molded ball portions from the mold when used in the mold sections defining the molding cavity. The materials allows for superior molded ball quality, more precise molding, and improved product durability by minimizing formation of flow or knit lines in the molded parts. The porosity of the metal allows for the trapped gases to be released much more readily than through mold sections, support pins and vent pins made from regular steel materials. Instead of flowing only though the limited area provided by the retracting support pins or vent pins, the gases flow evenly through the entire porous region. The porosity of the metal also allows for ease of release of the mold sections after completion of molding because the rough inner surface of the mold sections reduces adhesive surface contact between the mold sections and the molded ball portion.

Improved venting of these gases due to use of porous metal allows for use of reduced injection pressures in injection molding processes, because the back-pressure from the venting gases that resists flow of the molding material into the mold is reduced. Reduced injection pressure allows for improved centering of a ball core in the cavity, leading to superior ball properties, and reduced energy costs during production. Reduced injection pressure also allows for a flexibility in processing, with a wider processing window. Lower required injection pressures allow for a given manufacturing line to run at faster injection speed and/or a shorter cycle time, because the improved venting will reduce the back-pressure from vent gases. This reduced back-pressure, and resulting reduced resistance to flow of molding material, leads to reduced incidence of the problems discussed above.

Combination of conventional materials and porous metal in mold materials can provide particular advantages. Because use of porous metal for the entire structure of a mold can lead to reduced durability of the mold, porous metal preferably is used for making regions of the mold to maximize venting efficiency and improve process control. For example, as part of an injection or compression molding apparatus, porous metal can be used for making the mold sections, either in their entirety or only at, for example, their upper and lower poles or along their parting lines. Porous metal also can be used for making runners, support pins, vent pins, or ejection pins. These locations are points in the mold of greatest potential build-up from vent gases. Air in the flow path of the molten molding material can flow out of the flow path through these porous sections, reducing cavity pressure and the need for venting of this air through the spherical mold sections. The strength of the conventional materials gives the mold apparatus durability, while the porosity of the porous metal at these critical positions allows for the gas to flow through the pores much more readily than only venting through pins.

Particularly preferred embodiments of the present invention include equipment to raise or lower the pressure in the mold cavities or other flow regions of the equipment to improve its performance. Besides being used effectively at normal atmospheric pressure, molds made from porous metal can take advantage of increased pressure (i. e., compressed air) or decreased pressure (i. e., vacuum) during the molding process. For example, molding can be performed while applying a vacuum during the molding cycle to create a suction on the exterior surfaces of the porous metal that pulls vent gases through the porous metal out of the cavity. Operating under reduced pressure using a mold incorporating porous metal further enhances venting and reduces formation of pin marks and knit lines.

Compressed air also can be used advantageously with molds made from porous metal. For example, molding can be performed while applying compressed air to create positive pressure through the porous mold sections against the outer surface of the molded layer. This positive pressure is induced as the mold sections are disengaged from each other to push the molded layer from the surfaces of the mold sections. Use of vacuum and compressed air in the methods described above are made possible by the permeability to air of the porous metal and would not be effective using molds made only from conventional, non-porous materials.

Any metal or metal alloy with sufficient porosity can be used for mold cavities and methods within the scope of the present invention. A sufficient level of porosity in the metal generally is from about 5% to about 50%, more preferably from about 5% to about 40%, and most preferably from about 10% to about 30% of the metal volume. Examples of suitable materials for use in the present invention include porous aluminum, such as that marketed under the trade name METAPOR by NEST Technologies of Studio City, Calif., or porous stainless steel. A particular preferred material is Porcerax II, marketed by International Mold Steel of Florence, Ky. Porcerax II is a pumice-like 434-grade stainless steel that a structure of interconnected pores to 30 percent of its volume. The material is available having a range of average pore diameters of from about 3 to about 10 microns.

EXAMPLE

To test an embodiment of the present invention, three molds, numbered 1 to 3, were prepared for injection molding of a layer onto a golf ball core. The molding equipment used in the process included: a TD100-18ASE vertical injection molding machine, marketed by Nissei America of Anaheim, Calif., and a conventional four-cavity mold having 442 dimple indentations. The material to be molded comprised SURLYN ionomer, marketed by E. I. DuPont de Nemours & Company of Wilmington, Del., and PEBAX polyether amide block copolymer, marketed by Elf Atochem of Puteaux, France. The composition was dried in a vacuum oven for four hours prior to testing. Although this particular composition was selected for testing, any compositions normally used to produce injection-molded golf ball layers would be equally suitable. The interior surfaces of the mold sections were sprayed with a mold release marketed by IMS Company of Chagrin Falls, Ohio.

All parts of the three molds other than the support pins were made from conventional materials. Mold 1 incorporated support pins made from grade HR13 steel, a tooling steel commonly used for making pins for injection molding apparatus. Mold 2 incorporated support pins made from H13 coated with chrome-boron chloride-tungsten disulfide, a coating known to quality. Mold 3 incorporated support pins in three of the four sections made from conventional materials as used in Mold 1 and support pins in the remaining section made from Porcerax II. Therefore, one-quarter of the support pins in Mold 3 are made from porous material.

Each of these molds were used to mold layers onto golf ball cores, and the identical procedure was followed for each mold. Initially, the mold was cleaned using conventional methods. After the mold and machine were cleaned and stabilized, twelve injection shots (i.e., injected layers) were made without applying mold release agent to the inner surfaces of the mold sections. Then, three additional injection shots were made, and test samples from these were collected. Photographs of dimples at particular pin locations were taken using a DVC-120 Video Comparator, marketed by Deltronic Company of Santa Ana, Calif. Next, mold release agent was sprayed evenly into the cavity onto the inner surfaces of the mold sections. Then, fifteen additional injection shots were made. Test samples from these were taken, and photographs were taken of the first, third, fifth, tenth, and fifteenth shots using the Comparator of dimples at the same particular pin locations as previously photographed. These photographs were reviewed and determined to compare the presence of markings and imperfections in the dimples of the various prepared shots.

Additionally, balls prepared using molds incorporating core support pins made from porous metal were compared to reference balls prepared using molds incorporating pins made from conventional materials. Ball Type 1 was prepared using pins made from conventional materials. Ball Types 2 to 5 were made using core support pins made from porous metal. Each of the balls incorporated a core having a diameter of 1.58 in. and a compression of 65. Over each core was placed a cover comprising a blend of ionomer and thermoplastic elastomer. Ball 5 incorporated a cover using a different grade of ionomer from Balls 1 to 4. The balls were tested for cover hardness, ball compression, and impact durability.

Results

Photographs taken during the Example mold processes were reviewed to determine whether imperfections were present in the dimples produced on the molded surfaces. Comparison of the photographs of the dimples at identical locations for layers molded using the different molds shows differences in incidence of formation of imperfections on the layers. The photographs show formation of pin marks and knit lines on shots made using Molds 1 and 2. The photographs also show that these shots have dimple edges that are not sharp and clear. However, the photographs for shots made using Mold 3, which incorporated a number of pins made from porous material, show no visible knit lines, and they also show superior molding quality, i.e., dimples that are clear and sharp in structure. Clean dimple edges allow for superior aerodynamic properties and improved appearance of the resulting ball.

Additionally, injection pressures were measured during the molding processes. Molds 1 and 2 showed peak injection pressures of roughly 1,715 psi, while Mold 3 showed peak injection pressures of 1,655 psi. This reduction in peak injection pressure occurred even though only one of the four cavities in Mold 3 used pins made from porous metal material. Therefore, it is expected that using porous metal in all of the mold support pins would lead to a further decrease in injection pressure. As discussed previously, reduction in injection pressure leads to improved quality of the molded parts, reduced manufacture costs, and a wide processing window.

Testing for ball performance also showed advantages in using porous metal materials in the mold. Table 1 below shows the cover thickness, cover hardness, and ball compression for Ball Types 1 to 5. Table 1 also includes the results of the impact durability testing on the balls, shown as the number of failures (out of 12 balls per type) after 50, 100, and 150 impacts using an endurance machine set to impact test balls to a post-impact speed of 160 mph.

TABLE 1

Test Ball Data

| Ball Type | 1 | 2 | 3 | 4 | 5 |
|---|---|---|---|---|---|
| Cover Thickness (in.) | 0.05 | 0.05 | 0.0575 | 0.065 | 0.05 |
| Cover Hardness (Shore D) | 48 | 51 | 51 | 50 | 49 |
| Ball PGA Compression | 61 | 63 | 66 | 67 | 63 |
| Ball failures after 50 hits | 4 | 0 | 0 | 0 | 0 |
| Ball failures after 100 hits | 4 | 0 | 0 | 1 | 0 |
| Ball failures after 150 hits | 5 | 1 | 1 | 2 | 2 |

As shown above, reference Ball Type 1 and Ball Types 2 and 5 all have the same ball constructions; that is, they all are made using similar cores and have similar cover thicknesses. As discussed previously, Ball Types 1 and 2 further incorporate the same cover compositions, while Ball Type 5 incorporates a different cover composition.

Review of the ball failure data indicates that Ball Types 2 through 5, made using apparatus within the scope of the present invention, show far superior impact durability, demonstrated by lower failure rates. In particular Ball Types 2 and 5, while having the same cores as well as cover thicknesses as Ball Type 1, exhibited failure rates less than half that of Ball Type 1. Use of the cover composition in either Ball Type 2 or 5 provided for the superior durability demonstrated by balls prepared using an apparatus within the scope of the present invention. This indicates that the superior performance of balls prepared using such apparatus are not limited to a particular cover composition.

Comparison of reference Ball Type 1 to Ball Types 3 and 4, in addition to Ball Type 2 discussed above, further demonstrates the superior durability of balls prepared using an apparatus within the scope of the present invention. Ball types 3 and 4 incorporate smaller cores and thicker cover layers than Ball Types 1 and 2. Regardless of cover thickness or composition, balls prepared using an apparatus within the scope of the present invention exhibit far superior impact durability than balls prepared using conventional apparatus.

Overall, the impact durability test results show that Ball Types 2 to 5, made using a mold within the scope of the present invention, had substantially lower failure rates due to impact. This is expected, because use of porous metal pins and the resulting improved mold venting leads a reduced effect from knit lines and fewer areas of weakness on the covers, as discussed above.

It is important to note that all of the test preparations of balls discussed above were performed using material first dried carefully in a vacuum oven. It is expected that under typical operating conditions for molding of golf balls, and using less complete drying as is common to these molding processes, difficulties from venting would be even greater, due to the evaporation of moisture in the materials. Therefore, the performance of mold cavities incorporating porous metal in typical industrial service should be superior to that determined by these tests.

Although the invention has been disclosed in detail with reference only to the preferred embodiments, those skilled in the art will appreciate that additional golf ball covers can be made without departing from the scope of the invention. Accordingly, the invention is identified by the following claims.

I claim:

1. A mold configured for use in preparing a portion of a golf ball from a ball material comprising a contact region, wherein the contact region is configured to contact the ball material during preparation of the portion, and wherein the contact region comprises porous metal having a porosity between about 5% and about 50% by volume.

2. A mold as defined in claim 1, wherein the porous metal has a porosity between about 5% and about 40% by volume.

3. A mold as defined in claim 2, wherein the porous metal has a porosity between about 10% and about 30% by volume.

4. A mold as defined in claim 1, wherein the porous metal comprises interconnected pores.

5. A mold as defined in claim 4, wherein the interconnected pores have diameters between about 3 and about 10 microns.

6. A mold as defined in claim 1, wherein the porous metal comprises aluminum.

7. A mold as defined in claim 1, wherein the porous metal comprises a metal alloy.

8. A mold as defined in claim 7, wherein the metal alloy is stainless steel.

9. A mold as defined in claim 1, wherein the mold is configured to form the portion as a core, an intermediate layer, or a cover layer of a golf ball.

10. A mold as defined in claim 1, wherein the contact region of the mold comprises a plurality of mold sections that removably mate to define a generally spherical cavity.

11. A mold as defined in claim 10, wherein the mold sections comprise porous metal.

12. A mold as defined in claim 10, wherein the mold comprises a plurality of retractable support pins attached to the mold sections and projecting into the cavity to support an inner portion over which the portion is prepared, the support pins being retractable therefrom, the support pins comprising porous metal.

13. A mold as defined in claim 10, wherein the mold region comprises a plurality of extendable ejector pins attached to the mold sections, the ejector pins configured to extend into the cavity, to eject the portion, the ejector pins comprising porous metal.

14. A mold as defined in claim 10, wherein the mold region comprises a plurality of retractable vent pins attached to the mold sections, the vent pins configured to retract from the cavity to allow gases to exit the cavity, the vent pins comprising porous metal.

15. A mold as defined in claim 1, wherein:
the contact region of the mold comprises a sprue, runner, or gates;
the sprue, runner, or gates are configured to route ball material to flow into the cavity; and
the sprue, runner, or gates comprise porous metal.

16. A mold as defined in claim 1, wherein the mold is configured for use in an injection molding process.

17. A mold as defined in claim 1, wherein the mold is configured for use in a compression molding process.

18. A mold as defined in claim 1, wherein:

the contact region of the mold defines an interior space, in which the ball material is situated, and an exterior space; and the mold further comprises a vacuum device configured to reduce the pressure in the exterior space to a value less than the pressure in the interior space.

19. A mold as defined in claim 18, and further comprising a pressurizing device configured to increase the pressure in the exterior space to a value greater than the pressure in the interior space.

20. A mold as defined in claim 1, wherein the contact region defines an interior space in which the ball material is situated and an exterior space, the mold further comprising a pressurizing device configured to increase the pressure in the exterior space to a value greater an the pressure in the interior space.

21. A mold as defined in claim 1, wherein the porous metal has porosity sufficient to allow gases to escape through the porous metal.

22. A method for forming a portion of a golf ball, the method comprising:

preparing a mold configured for use in preparing a portion of a golf ball from a ball material, wherein the mold comprises porous metal having a porosity between about 5% and about 50% by volume, wherein the mold has an exterior space having an exterior pressure and an interior space having an interior pressure, the mold further comprising a vacuum device configured to reduce the exterior pressure to a value less than the interior pressure;

using the vacuum device to reduce the exterior pressure below the interior pressure sufficient to increase flow of gas through the porous metal from the interior space to the exterior space; and placing the ball material into the mold to form the portion so that gas flows from the interior space to the exterior space.

23. A method for forming a portion of a golf ball, the method comprising:

preparing a mold configured for use in preparing a portion of a golf ball from a ball material, wherein the mold comprises porous metal having a porosity between about 5% and about 50% by volume, wherein the mold has an exterior space having an exterior pressure and an interior space having an interior pressure, the mold further comprising a pressurizing device configured to increase the exterior pressure to a value greater than the interior pressure;

placing the ball material into the mold to form the portion; and using the pressurizing device to increase the exterior pressure above the interior pressure to a value sufficient to improve release of the portion from the mold.

* * * * *

UNITED STATES PATENT AND TRADEMARK OFFICE
CERTIFICATE OF CORRECTION

PATENT NO.    : 6,776,942 B2
DATED         : August 17, 2004
INVENTOR(S)   : Hyun Jin Kim It is certified that error appears in the above-identified patent and that said Letters Patent is hereby corrected as shown below:

Column 5,
Line 51, after "pores" please insert -- ranging from about 20 --.

Column 6,
Line 13, after "known to" please insert -- inprove tool life and mold --.

Signed and Sealed this

Nineteenth Day of April, 2005

JON W. DUDAS
*Director of the United States Patent and Trademark Office*